United States Patent
Kajiyama et al.

(10) Patent No.: US 10,086,808 B2
(45) Date of Patent: Oct. 2, 2018

(54) AUTOMATIC BRAKE DEVICE FOR SADDLE RIDING TYPE VEHICLE

(71) Applicant: HONDA MOTOR CO., LTD., Tokyo (JP)

(72) Inventors: Keigo Kajiyama, Wako (JP); Satoshi Saito, Wako (JP); Makoto Toda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 126 days.

(21) Appl. No.: 15/212,670

(22) Filed: Jul. 18, 2016

(65) Prior Publication Data
US 2017/0028971 A1 Feb. 2, 2017

(30) Foreign Application Priority Data
Jul. 27, 2015 (JP) ................. 2015-147572

(51) Int. Cl.
*B60T 7/22* (2006.01)
*B60T 8/32* (2006.01)
(Continued)

(52) U.S. Cl.
CPC ............ *B60T 7/22* (2013.01); *B60T 8/00* (2013.01); *B60T 8/1706* (2013.01);
(Continued)

(58) Field of Classification Search
CPC . B60T 7/22; B60T 8/3225; B60T 8/00; B60T 8/1706; B60T 2201/022;
(Continued)

(56) References Cited

U.S. PATENT DOCUMENTS 8,388,071 B2 * 3/2013 Yokoyama .............. B60T 1/10
180/65.21
9,580,009 B1 * 2/2017 Lenker ................. B60Q 1/2603
(Continued)

FOREIGN PATENT DOCUMENTS

EP 1568561 A1 * 8/2005 .............. B60T 8/261
JP 11-014648 A 1/1999
(Continued)

OTHER PUBLICATIONS

Giovanni Savino et al: "Autonomous Emergency Braking for Cornering Motorcycle", Proceedings of the 24th International Technical Conference on the Enhanced Safety of Vehicles, Jun. 11, 2015, Gothenburg, Sweden. URL:https://www-esv.nhtsa.dot.gov/proceedings/24/files/24ESV-000220.PDF. Retrieved Jan. 9, 2018. (Year: 2015).*

*Primary Examiner* — Jeffrey C Boomer
(74) *Attorney, Agent, or Firm* — Squire Patton Boggs (US) LLP

(57) ABSTRACT

A brake modulator controls actuation of front and rear brakes, and includes a collision possibility determining unit, an automatic brake control unit, and a brake operation determining unit. When the collision possibility determining unit determines that there is a possibility of collision, and the brake operation determining unit determines that brake operation by a driver is absent, the automatic brake control unit first actuates only the rear brake to generate a rear wheel braking force, and also actuates the front brake 2 to generate a front wheel braking force.

6 Claims, 5 Drawing Sheets

(51) Int. Cl.
*B60W 30/08* (2012.01)
*B60T 8/00* (2006.01)
*B62M 7/00* (2010.01)
*B62L 3/08* (2006.01)
*B60T 8/17* (2006.01)
*B62J 99/00* (2009.01)
*B62K 11/00* (2006.01)

(52) U.S. Cl.
CPC ........... *B60T 8/3225* (2013.01); *B60W 30/08* (2013.01); *B62L 3/08* (2013.01); *B62M 7/00* (2013.01); *B60T 2201/022* (2013.01); *B62J 2099/002* (2013.01); *B62K 11/00* (2013.01); *B62K 2207/00* (2013.01)

(58) Field of Classification Search
CPC .... B62K 11/00; B62K 2207/00; B60W 30/08; B62M 7/00; B62L 3/08; B62J 2099/002
See application file for complete search history.

(56) References Cited

U.S. PATENT DOCUMENTS

| | | | |
|---|---|---|---|
| 9,701,307 B1* | 7/2017 | Newman | B60W 30/09 |
| 2006/0055240 A1* | 3/2006 | Toyota | B60K 6/365 303/152 |
| 2006/0238025 A1* | 10/2006 | Mori | B60T 8/1766 303/186 |
| 2007/0075582 A1* | 4/2007 | Nakayama | B60T 8/1706 303/146 |
| 2013/0238206 A1* | 9/2013 | Lemejda | B60T 8/1706 701/70 |
| 2014/0074369 A1* | 3/2014 | Kim | B60L 7/26 701/70 |
| 2016/0075313 A1* | 3/2016 | Moriizumi | B60T 7/12 701/93 |
| 2016/0264110 A1* | 9/2016 | Seto | B60T 8/1755 |
| 2017/0028972 A1* | 2/2017 | Kajiyama | B60T 8/3225 |

FOREIGN PATENT DOCUMENTS

| | | | | |
|---|---|---|---|---|
| JP | 2008-230295 A | 10/2008 | | |
| JP | 2009-012660 A | 1/2009 | | |
| JP | 2014-162320 A | 9/2014 | | |
| WO | WO-2014058297 A1 * | 4/2014 | | B60T 7/042 |

* cited by examiner

AUTOMATIC BRAKE DEVICE FOR SADDLE RIDING TYPE VEHICLE

BACKGROUND

Field

The present invention relates to an automatic brake device for a saddle riding type vehicle.

Description of the Related Art

Conventionally, an automatic brake device for a vehicle is known which uses, for automatic brake control of the vehicle, the speed of the own vehicle and a target deceleration set when avoiding contact of the own vehicle with a front obstacle (see Patent Document 1 (Japanese Patent Laid-Open No. 1999-14648), for example).

In a case where an automatic brake device as described above is applied to a saddle riding type vehicle such as a motorcycle or the like, it is desirable not only to avoid contact with a front obstacle but also to consider suppression of an unintended disturbance of the attitude of a driver at a time of automatic brake control.

SUMMARY

It is accordingly an object of the present invention to suppress an unintended disturbance of the attitude of a driver at a time of automatic brake control in an automatic brake device for a saddle riding type vehicle.

According to an embodiment of the invention, there is provided an automatic brake device for a saddle riding type vehicle, the automatic brake device including a front brake and a rear brake capable of being actuated independently of each other, and a brake modulator configured to control actuation of the front and rear brakes. The brake modulator includes collision possibility determining means for determining a possibility of collision of the own vehicle with a front obstacle, automatic brake control means for performing automatic brake control that automatically increases braking forces of the front and rear brakes when the collision possibility determining means determines that there is a possibility of collision, and brake operation determining means for determining presence or absence of brake operation by a driver of the own vehicle. When the collision possibility determining means determines that there is a possibility of collision, and the brake operation determining means determines that the brake operation by the driver is absent, the automatic brake control means first actuates only the rear brake to generate a rear wheel braking force, and then also actuates the front brake to generate a front wheel braking force.

The saddle riding type vehicle includes vehicles in general to be ridden by a driver straddling a vehicle body. The saddle riding type vehicle includes not only motorcycles (including motor-assisted bicycles and motor scooter type vehicles) but also three-wheeled vehicles (including not only vehicles having one front wheel and two rear wheels but also vehicles having two front wheels and one rear wheel) or four-wheeled vehicles.

According to some embodiments, when the collision possibility determining means determines that there is a possibility of collision, and the brake operation determining means determines that the brake operation by the driver is absent, the automatic brake control means first actuates only the rear brake to a lock limit, and then also actuates the front brake while maintaining a lock limit actuated state of the rear brake.

According to some embodiments, the brake modulator includes a memory configured to store a braking force map having an axis of ordinates indicating magnitude of the braking force of one of the front and rear brakes and having an axis of abscissas indicating magnitude of the braking force of the other of the front and rear brakes. A limit line (E) and a limit line (C) respectively indicate braking forces as lock limits of the front and rear brakes are described in the braking force map. The automatic brake control means actuates the rear brake along the limit line (C) of the rear brake in the braking force map.

According to some embodiments, the brake modulator includes friction coefficient estimating means for estimating a road surface friction coefficient, and a plurality of limit lines (E) and a plurality of limit lines (C) are described according to the road surface friction coefficient. The automatic brake control means selects the limit line (E) and the limit line (C) according to the road surface friction coefficient.

While automatic braking by the front and rear brakes is made possible, in some embodiments, only the rear brake is actuated at a time of a start of the automatic braking. Thus, the pitching of the own vehicle is suppressed, and a feeling of deceleration is given to the driver. Therefore an unintended disturbance of the attitude of the driver can be suppressed.

In some embodiments, automatic brake control that makes the most of the braking force of the rear brake can be performed.

In some embodiments, automatic brake control can be performed easily by referring to the control force map.

In some embodiments, limit braking of the front and rear brakes can be performed according to the estimated road surface friction coefficient.

DETAILED DESCRIPTION

Figure 1:
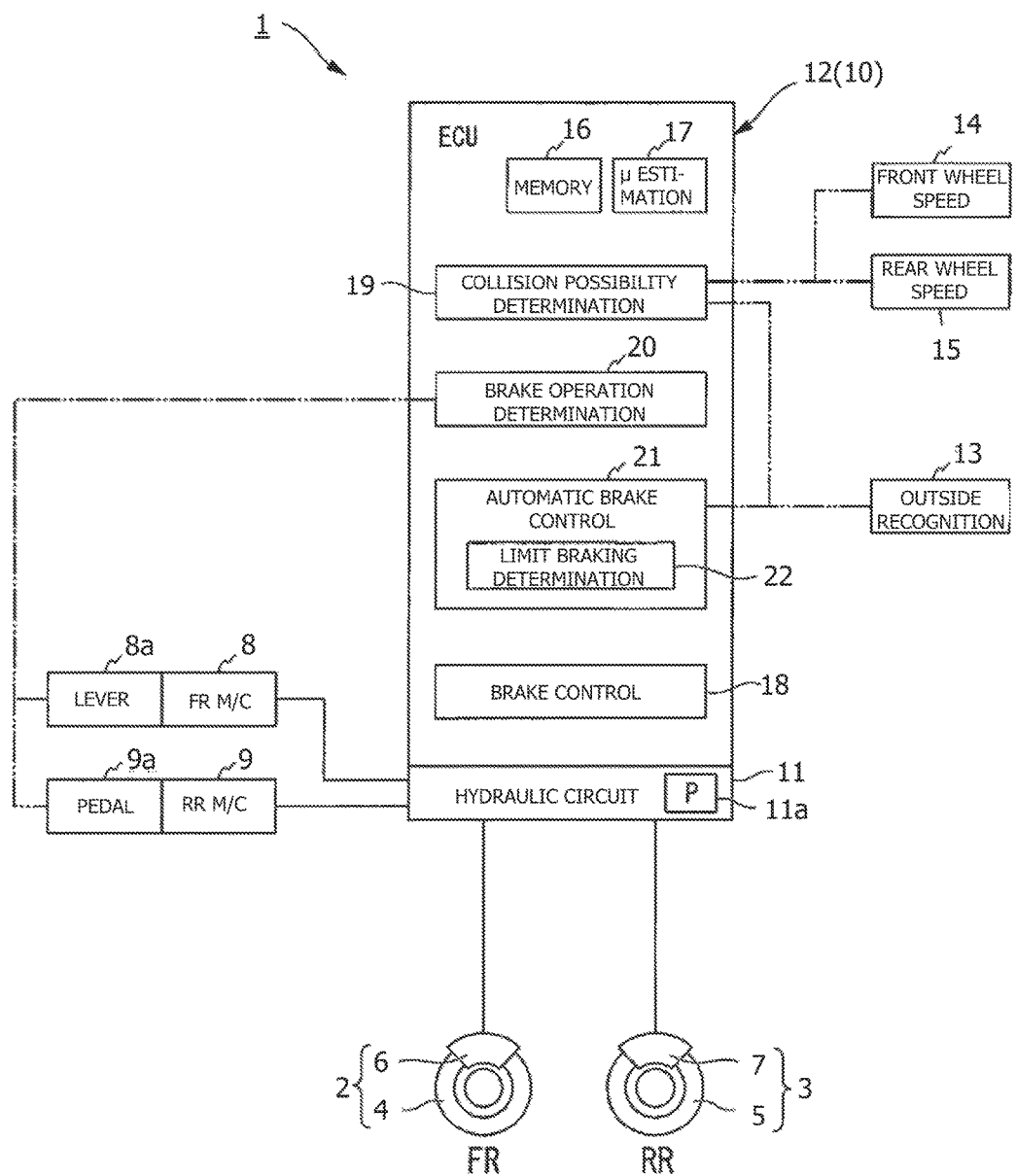
FIG. 1 is a block diagram of a brake control device in an embodiment of the present invention.

Embodiments of the present invention will hereinafter be described with reference to the drawings.

A brake control device 1 according to an embodiment is for example applied to a saddle riding type vehicle such as a motorcycle having a front wheel and a rear wheel or the like.

The brake control device 1 has a front brake 2 and a rear brake 3 that are provided independently of each other.

The front brake 2 is configured as a hydraulic disk brake including a front brake disk 4 attached to a front wheel of the saddle riding type vehicle so as to be rotatable integrally with the front wheel and a front brake caliper 6 supplied with a hydraulic pressure (oil pressure) to clamp the front brake disk 4.

The rear brake 3 is configured as a hydraulic disk brake including a rear brake disk 5 attached to a rear wheel of the saddle riding type vehicle so as to be rotatable integrally with the rear wheel and a rear brake caliper 7 supplied with a hydraulic pressure (oil pressure) to clamp the rear brake disk 5.

The brake control device 1 has a front master cylinder 8 and a rear master cylinder 9 provided independently of each other.

The front master cylinder 8 is coupled with a front brake operating element 8a such as a brake lever or the like. The front master cylinder 8 generates a hydraulic pressure (oil pressure) according to an operation of the front brake operating element 8a.

The rear master cylinder 9 is coupled with a rear brake operating element 9a such as a brake pedal or the like. The rear master cylinder 9 generates a hydraulic pressure (oil pressure) according to an operation of the rear brake operating element 9a.

The brake control device 1 has a brake modulator 10 interposed between the front and rear master cylinders 8 and 9 and the front and rear brake calipers 6 and 7. The brake control device 1 constitutes a so-called by-wire type brake system that electrically links the front and rear master cylinders 8 and 9 to the front and rear brake calipers 6 and 7.

The brake modulator 10 includes a hydraulic circuit unit 11 that can change a hydraulic passage and which has oil pressure generating means ha such as a pump or the like. An electronic control unit (ECU) 12 controls actuation of the hydraulic circuit unit 11.

The front and rear master cylinders 8 and 9 are coupled to the front and rear brake calipers 6 and 7 via the hydraulic circuit unit 11. The hydraulic circuit unit 11 at normal times blocks communication between the front and rear master cylinders 8 and 9 and the front and rear brake calipers 6 and 7, and generates, in the oil pressure generating means 11a, an oil pressure corresponding to oil pressures generated in the front and rear master cylinders 8 and 9. The brake modulator 10 supplies the oil pressure generated by the hydraulic circuit unit 11 to the front and rear brake calipers 6 and 7 as appropriate, thereby generating braking forces in the front and rear brakes 2 and 3. At a time of failure of the hydraulic circuit unit 11, for example, the oil pressures generated in the front and rear master cylinders 8 and 9 can be supplied to the front and rear brake calipers 6 and 7.

The brake modulator 10 can generate braking forces in the front and rear brakes 2 and 3 as appropriate by performing automatic brake control based on various kinds of information including vehicle information separately from operation of the front and rear brake operating elements 8a and 9a by a driver.

The ECU 12 is supplied with detection information about amounts of operation of the front and rear brake operating elements 8a and 9a, detection information of outside recognizing means 13 to be described later, and detection information of wheel speed sensors 14 and 15 for the front and rear wheels.

The brake modulator 10 generates an oil pressure corresponding to the amounts of operation of the front and rear brake operating elements 8a and 9a in the oil pressure generating means 11a of the hydraulic circuit unit 11, and supplies the oil pressure to the front and rear brake calipers 6 and 7. Thus, the brake modulator 10 can generate braking forces in the front and rear brakes 2 and 3, and perform automatic brake control not depending on the amounts of operation of the front and rear brake operating elements 8a and 9a.

The outside recognizing means 13 includes for example a radar device installed in a front end portion of the saddle riding type vehicle. The radar device emits electromagnetic waves such as millimeter waves or the like toward the front of the vehicle in predetermined control cycles, and receives the reflected waves. The ECU 12 determines whether or not there is an obstacle in front of the vehicle (including another vehicle) on the basis of a state of transmission and reception of millimeter waves in the radar device, and when there is an obstacle, calculates a distance and a speed relative to the obstacle. The obstacle will hereinafter be referred to as a front obstacle.

Incidentally, the outside recognizing means 13 may use a camera besides the radar device, and may be a configuration combining transmission and reception information of the radar device and imaging information of the camera.

The ECU 12 is formed by a microcomputer including a central processing unit, a memory, and an input-output interface as hardware (only the memory is depicted by reference numeral 16). The ECU 12 performs various kinds of control processing according to detection signals of various kinds of sensors or switches and outside recognition information or the like. The ECU performs anti-lock brake control (ABS control) and automatic brake control to be described later or the like by controlling actuation of the front and rear brakes 2 and 3 on the basis of a program stored in the memory 16.

The ECU 12 includes a friction coefficient estimating unit 17 that performs processing of estimating a road surface friction coefficient. The road surface friction coefficient is estimated by calculating the friction coefficient according to a difference between the wheel speeds of the front and rear wheels. Used as the difference between the wheel speeds of the front and rear wheels is for example a difference between the wheel speeds of the rear wheel as a driving wheel and the front wheel as a driven wheel, a difference between the wheel speeds of the front and rear wheels due to a momentary actuation of the brake modulator 10, or the like.

The memory 16 of the ECU 12 stores a braking force map M for the front and rear wheels.

Figure 2:
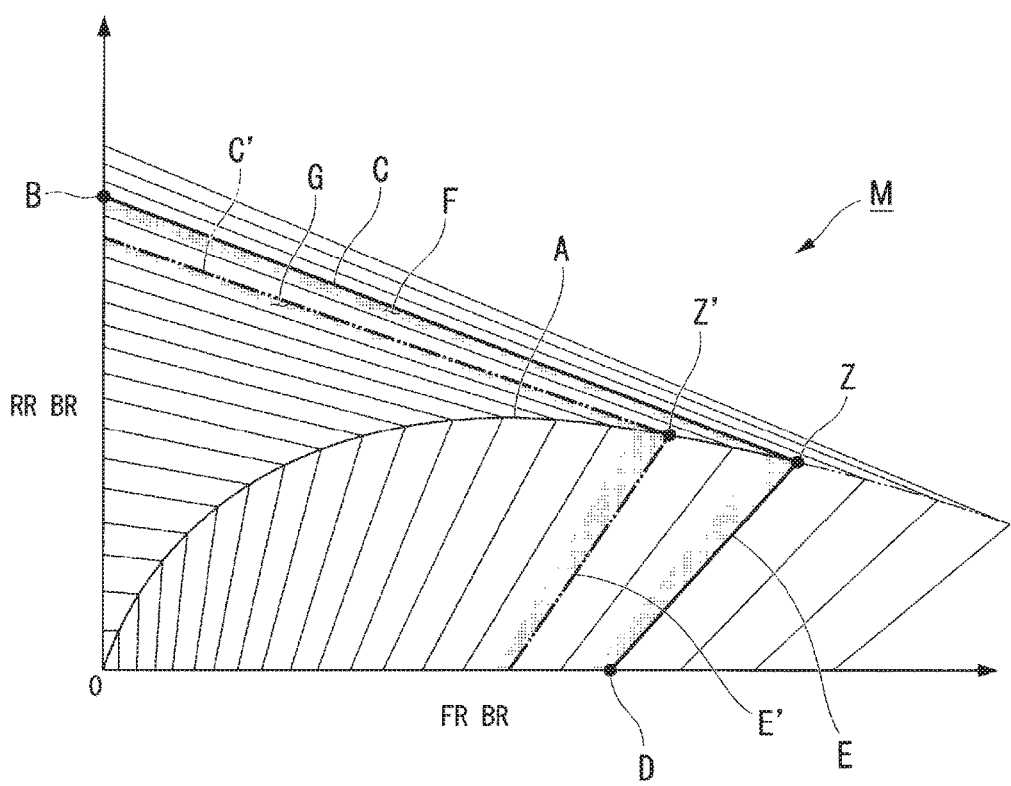
FIG. 2 a braking force map stored by a memory of the brake control device.

As depicted in FIG. 2, the braking force map M for example has an axis of ordinates indicating the braking force of the rear brake 3 and an axis of abscissas indicating the braking force of the front brake 2. In the braking force map M, a curve A represents an ideal increase curve of the braking forces of the front and rear brakes 2 and 3. A right end Z of the curve A in FIG. 2 is a front-rear braking limit point at which the saddle riding type vehicle produces a maximum deceleration by the combination of the front and rear brakes 2 and 3, and is a front-rear lock limit point indicating that increasing the braking forces to this point or more locks at least one of the front and rear wheels.

In addition, a point B on the axis of ordinates is a rear wheel braking limit point when only the rear brake 3 is actuated, and is a rear lock limit point indicating that increasing the rear wheel braking force to this point or more locks the rear wheel. In addition, a straight line C from the rear lock limit point B to the front-rear lock limit point Z is a rear brake limit line indicating a braking force as a lock limit of the rear brake 3.

In addition, a point D on the axis of abscissas is a front wheel braking limit point when only the front brake 2 is actuated, and is a front lock limit point indicating that increasing the front wheel braking force to this point or more locks the front wheel. In addition, a straight line E from the front lock limit point D to the front-rear lock limit point Z is a front brake limit line indicating a braking force as a lock limit of the front brake 2.

In the braking force map M, a region F defined by the front and rear brake limit lines E and C is set as a non-lock region in which the locking of the front and rear wheels by the front and rear brakes 2 and 3 can be avoided.

A plurality of front brake limit lines E and a plurality of rear brake limit lines C are set according to the road surface friction coefficient. The front and rear brake limit lines E and C used in automatic brake control are selected according to the road surface friction coefficient estimated by the friction coefficient estimating unit 17.

In the braking force map M, for example a small road surface friction coefficient is calculated which is at a level obtained by dividing the estimated road surface friction coefficient by a safety factor (for example 1.2 or the like). A region G defined by front and rear brake limit lines E' and C' corresponding to the small road surface friction coefficient at this level is set as a collision possibility determination region used in collision possibility determination to be described later. The front and rear brake limit lines E' and C' intersect each other at a point of intersection Z' on the curve A. The point of intersection Z' corresponds to an upper limit braking force in the collision possibility determination region G.

The ECU 12 includes a brake control unit 18 performing normal brake control that actuates the front and rear brakes 2 and 3 according to input from the front and rear brake operating elements 8a and 9a, anti-lock brake control that avoids the locking of the front and rear wheels by the brakes, and the like. A collision possibility determining unit 19 determines a possibility of collision of the saddle riding type vehicle with a front obstacle on the basis of the detection information of the outside recognizing means 13 and the front and rear wheel speed sensors 14 and 15. A brake operation determining unit 20 determines conditions such as the presence or absence of brake operation by the driver of the saddle riding type vehicle, amounts of the operation, and the like. An automatic brake control unit 21 performs automatic brake control that actuates the front and rear brakes 2 and 3 more strongly than the normal brake control according to the conditions of the brake operation (automatically increases the braking forces of the front and rear brakes 2 and 3) when the collision possibility determining unit 19 determines that there is a possibility of collision.

Processing performed in the ECU 12 according to the present embodiments will be described in the following with reference to FIG. 3 and FIG. 4. This processing is performed repeatedly in predetermined control cycles.

Figure 3:
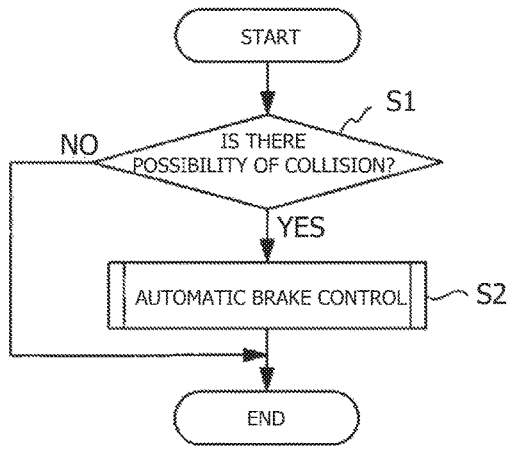
FIG. 3 is a flowchart depicting processing of the brake control device.

As depicted in FIG. 3, in step S1, the collision possibility determining unit 19 determines the possibility of collision of the saddle riding type vehicle with a front obstacle. Specifically, the collision possibility determining unit 19 obtains information about the presence or absence of a front obstacle, a relative distance and a relative speed between the front obstacle and the saddle riding type vehicle, and the like on the basis of detection values of the outside recognizing means 13, and calculates the vehicle speed of the saddle riding type vehicle on the basis of detection values of the wheel speed sensors 14 and 15.

Referring also to FIG. 2, the collision possibility determining unit 19 determines whether or not there is a possibility of collision with the front obstacle even when a braking force at the upper limit (for example the point of intersection Z') in the collision possibility determination region G of the braking force map M acts on the saddle riding type vehicle having the calculated vehicle speed.

When the determination in step S1 is NO (there is no possibility of collision), the present processing is directly ended. When the determination in step S1 is YES (there is a possibility of collision), the processing proceeds to step S2, where the automatic brake control unit 21 performs automatic brake control to be described in the following.

Figure 4:
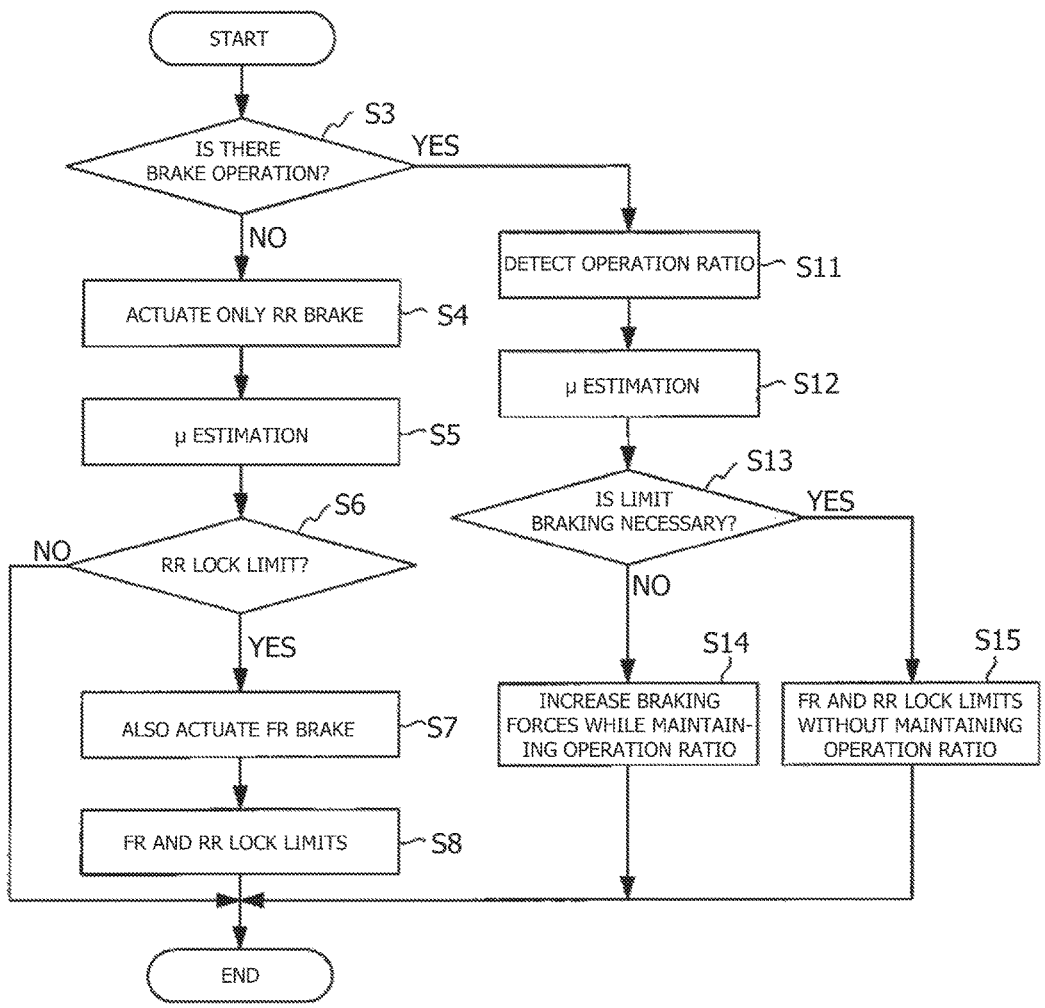
FIG. 4 is a flowchart depicting processing of automatic brake control in FIG. 3.

As depicted in FIG. 4, the automatic brake control unit 21 first determines the presence or absence of brake operation on the basis of detection information of brake operation detecting means not depicted in the figures which detecting means is attached to the front and rear brake operating elements 8a and 9a (step S3). When the determination in step S3 is NO (absence of brake operation), the processing proceeds to step S4. When the determination in step S3 is YES (presence of brake operation), the processing proceeds to step S11 to be described later.

In step S4, as automatic brake control, the automatic brake control unit 21 first actuates only the rear brake 3 to generate a rear wheel braking force.

Here, when the front brake 2 is actuated to generate a front wheel braking force as automatic brake control in the state of absence of brake operation, the saddle riding type vehicle tends to cause relatively large pitching (nose dive), which tends to lead to an unintended disturbance of the attitude of the driver.

Besides, in the present embodiments, only the rear brake 3 is first actuated to generate a rear wheel braking force. Thus, the occurrence of pitching of the saddle riding type vehicle is suppressed, and the driver is given a feeling of deceleration. A disturbance of the attitude of the driver is therefore suppressed.

At the same time as step S4, in step S5, the automatic brake control unit 21 reads an estimated value of the road surface friction coefficient from the friction coefficient estimating unit 17. Further, the automatic brake control unit 21 selects limit lines according to the estimated value of the road surface friction coefficient from among the plurality of limit lines E and the plurality of limit lines C for the front and rear brakes 2 and 3, respectively, in the braking force map M.

Thereafter, in step S6, the automatic brake control unit 21 increases the rear wheel braking force until the rear wheel braking force reaches the selected limit line C of the rear brake 3 (see an arrow Y1 in FIG. 5), and determines whether or not the rear wheel braking force has increased to the selected limit line C. When the determination in step S6 is NO (the rear wheel braking force has not reached the limit line C), the present processing is ended on a temporary basis. When the determination in step S6 is YES (the rear wheel braking force has reached the limit line C), the processing proceeds to step S7, where braking is performed while the front brake 2 is also used along the selected limit line C of the rear brake 3.

Figure 5:
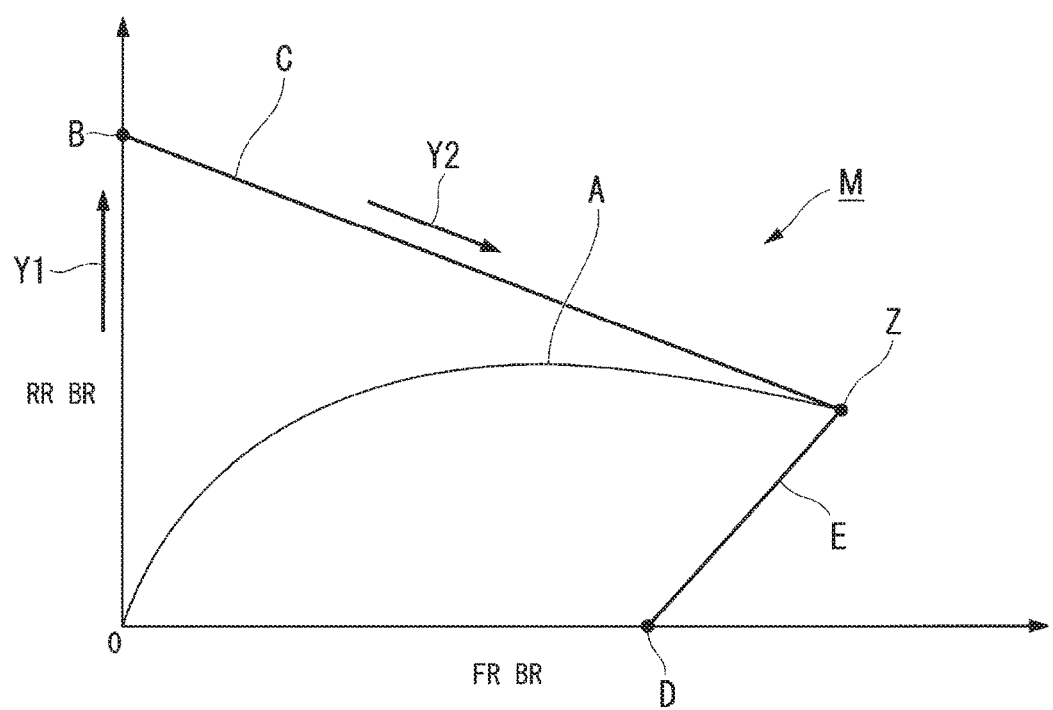
FIG. 5 is a diagram of assistance in explaining a case of increasing the braking forces of a front brake and a rear brake when it is determined that brake operation is absent in FIG. 4.

In step S7, the automatic brake control unit 21 also actuates the front brake 2 along the limit line C of the rear brake 3 in the braking force map M, that is, while maintaining the lock limit actuated state of the rear brake 3 (see an arrow Y2 in FIG. 5).

When the actuation of the front brake 2 produces a front wheel braking force, the pitching of a vehicle body causes a load shift in the saddle riding type vehicle, thus decreasing the braking force as the lock limit of the rear brake 3. Therefore, as the braking force of the front brake 2 is increased, the maximum braking force of the rear brake 3 is gradually decreased, but the braking force (deceleration) of the vehicle as a whole is increased, the braking force (deceleration) of the vehicle as a whole being obtained by adding together the braking forces of the front and rear brakes 2 and 3.

Next, in step S8, the automatic brake control unit 21 increases the braking force of the front brake 2 until the braking forces of the front and rear brakes 2 and 3 reach the front-rear lock limit point Z, which is the point of intersection of the limit lines E and C of the front and rear brakes 2 and 3. Then, when the braking forces of the front and rear wheels have reached the front-rear lock limit point Z, the control of increasing the braking forces of the front and rear brakes 2 and 3 is ended while maintaining this state (limit braking state of the front and rear brakes 2 and 3).

The limit braking state of the front and rear brakes 2 and 3 is canceled according to a reset condition such for example as the occurrence of a stopped state in which the vehicle speed is zero, the disappearance of the front obstacle, or the like.

Figure 6:
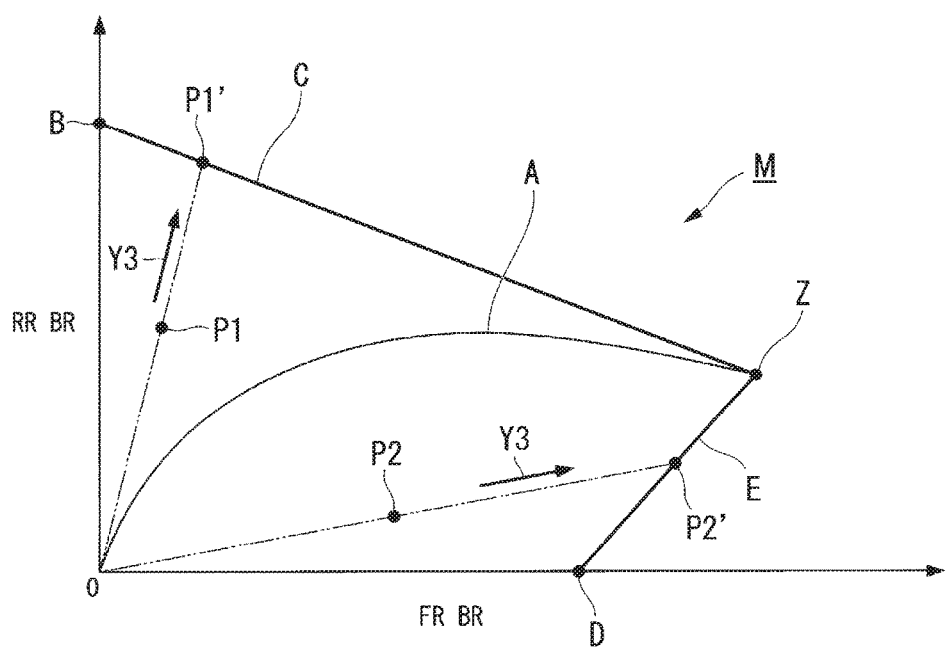
FIG. 6 is a diagram of assistance in explaining a first example of a case of increasing the braking forces of the front and rear brakes when it is determined that the brake operation is present in FIG. 4.

When it is determined in step S3 that the brake operation is present, on the other hand, the automatic brake control unit 21 in step S11 reads a ratio between operations of the front and rear brakes 2 and 3 by the driver from the brake operation determining unit 20. Specifically, the automatic brake control unit 21 reads the front-rear operation ratio at a present brake operation position (see middle point P1 or P2 in FIG. 6) on the braking force map M.

At the same time as step S11, the automatic brake control unit 21 in step S12 reads an estimated value of the road surface friction coefficient from the friction coefficient estimating unit 17. Further, the automatic brake control unit 21 selects limit lines corresponding to the estimated value of the road surface friction coefficient from among the plurality of limit lines E and the plurality of limit lines C for the front and rear brakes 2 and 3, respectively, in the braking force map M.

Figure 7:
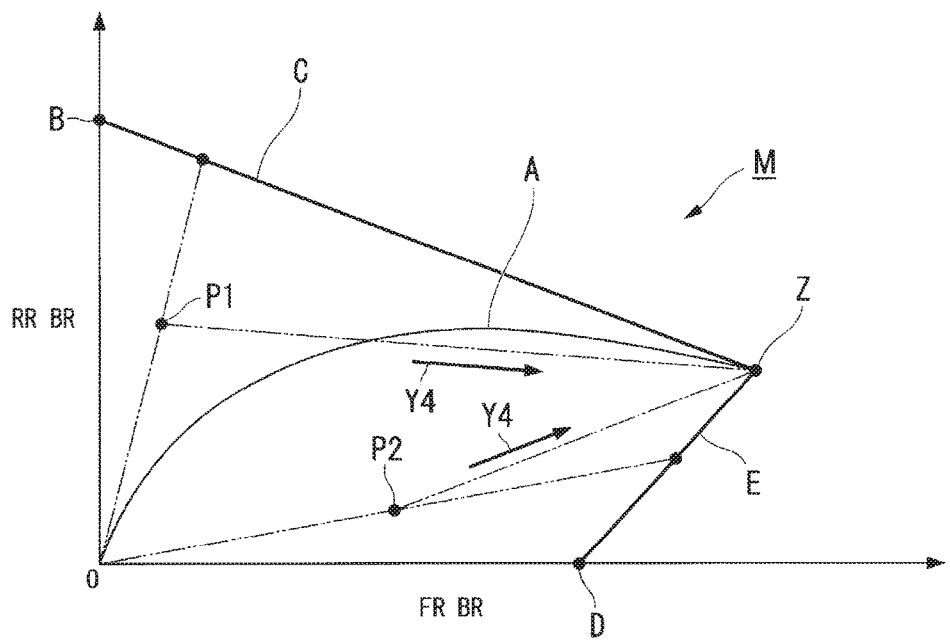
FIG. 7 is a diagram of assistance in explaining a second example of the case of increasing the braking forces of the front and rear brakes when it is determined that the brake operation is present in FIG. 4.

In step S13, the automatic brake control unit 21 determines whether to increase the braking forces of the front and rear brakes 2 and 3 while maintaining the ratio between the operations of the front and rear brakes 2 and 3 by the driver (see arrows Y3 in FIG. 6), or whether to make the front and rear brakes 2 and 3 reach the limit braking state in a shortest time without maintaining the ratio between the operations (see arrows Y4 in FIG. 7). This determination is made according to whether or not the possibility of collision with the front obstacle can be eliminated with the braking forces that maintain the ratio between the operations. The automatic brake control unit 21 can be said to include a limit braking necessity determining unit 22 that makes the above-described determination.

When the determination in step S13 is NO (increase the braking forces while maintaining the ratio between the operations of the front and rear brakes 2 and 3), in step S14, the ratio between the operations of the front and rear brakes 2 and 3 is maintained, and at least one of the braking forces of the front and rear brakes 2 and 3 is made to reach the limit line E or C in the braking force map M (made to reach point P1' or P2' on the limit line C or E, respectively).

By thus increasing the braking forces of the front and rear brakes 2 and 3 while maintaining the ratio between the operations of the front and rear brakes 2 and 3 by the driver, it is possible to perform automatic brake control while reducing a feeling of strangeness felt by the driver.

When the determination in step S13 is YES (increase to the limit braking force without maintaining the ratio between the operations of the front and rear brakes 2 and 3), in step S15, the braking forces of the front and rear brakes 2 and 3 are made to reach the front-rear lock limit point Z in a shortest time regardless of the ratio between the operations of the front and rear brakes 2 and 3.

The possibility of collision of the saddle riding type vehicle can be eliminated more surely by thus making the braking forces of the front and rear brakes 2 and 3 reach the front-rear lock limit point Z immediately regardless of the ratio between the operations of the front and rear brakes 2 and 3 by the driver.

As described above, a brake control device 1 in the foregoing embodiment includes a front brake 2 and a rear brake 3 capable of being actuated independently of each other. A brake modulator 10 is configured to control actuation of the front and rear brakes 2 and 3; the brake modulator 10 includes a collision possibility determining unit 19 configured to determine a possibility of collision of an own vehicle with a front obstacle, an automatic brake control unit 21 configured to perform automatic brake control that automatically increases the braking forces of the front and rear brakes 2 and 3 when the collision possibility determining unit 19 determines that there is a possibility of collision, and a brake operation determining unit 20 configured to determine presence or absence of brake operation by a driver of the own vehicle. When the collision possibility determining unit 19 determines that there is a possibility of collision and the brake operation determining unit 20 determines that brake operation by the driver is absent, the automatic brake control unit 21 first actuates only the rear brake 3 to generate a rear wheel braking force, and then also actuates the front brake 2 to generate a front wheel braking force.

According to this constitution, while automatic braking by the front and rear brakes 2 and 3 is made possible, only the rear brake 3 is actuated at a time of a start of automatic braking. Thus, the pitching of the own vehicle is suppressed, and a feeling of deceleration is given to the driver. Therefore an unintended disturbance of the attitude of the driver can be suppressed.

In the brake control device 1, when the collision possibility determining unit 19 determines that there is a possibility of collision, and the brake operation determining unit 20 determines that brake operation by the driver is absent, the automatic brake control unit 21 first actuates only the rear brake 3 to a lock limit, and then also actuates the front brake 2 while maintaining a lock limit actuated state of the rear brake 3. Thus, automatic brake control that makes the most of the braking force of the rear brake 3 can be performed.

In the brake control device 1, the brake modulator 10 includes a memory 16 storing a braking force map M having an axis of ordinates indicating magnitude of one of the braking forces of the front and rear brakes 2 and 3 and having an axis of abscissas indicating magnitude of the braking force of the other of the front and rear brakes 2 and 3, a limit line E and a limit line C indicating braking forces as lock limits of the front and rear brakes 2 and 3 are described in the braking force map M, and the automatic brake control unit 21 actuates the rear brake 3 along the limit line C of the rear brake 3 in the braking force map M. Thus, automatic brake control can be performed easily by referring to the control force map M.

In the brake control device 1, the brake modulator 10 includes a friction coefficient estimating unit 17 configured to estimate a road surface friction coefficient, a plurality of limit lines E and a plurality of limit lines C are described according to the road surface friction coefficient, and the automatic brake control unit 21 selects the limit line E and the limit line C according to the road surface friction coefficient. Thus, limit braking of the front and rear brakes 2 and 3 can be performed according to the estimated road surface friction coefficient.

On the other hand, in the brake control device 1, when the collision possibility determining unit 19 determines that there is a possibility of collision, and the brake operation determining unit 20 determines that brake operation by the driver is present, the automatic brake control unit 21 changes a manner of increasing the braking forces of the front and rear brakes 2 and 3 according to the brake operation by the driver.

According to this constitution, while automatic braking by the front and rear brakes 2 and 3 is made possible, the manner of increasing the braking forces of the front and rear brakes 2 and 3 is changed according to the brake operation by the driver. Thus, optimum automatic brake control can be performed according to the brake operation by the driver, by for example maintaining a ratio between operations of the front and rear brakes 2 and 3 by the driver and thus enabling natural automatic braking that reduces a feeling of strangeness when there is a margin for the braking of the own vehicle, or performing limit braking immediately regardless of the ratio between the operations when there is no margin for the braking of the own vehicle.

In the brake control device 1, the automatic brake control unit 21 includes a limit braking necessity determining unit 22 configured to determine whether to increase the braking forces of the front and rear brakes 2 and 3 while maintaining a ratio between operations of the front and rear brakes 2 and 3 by the driver or to make the front and rear brakes 2 and 3 reach a limit braking state without maintaining the ratio between the operations. Thus, on the basis of the determination of the limit braking necessity determining unit 22, switching can be performed between performing automatic brake control that reduces a feeling of strangeness by maintaining the ratio between the operations of the front and rear brakes 2 and 3 and performing limit braking of the front and rear brakes 2 and 3 immediately regardless of the ratio between the operations of the front and rear brakes 2 and 3.

It is to be noted that the present invention is not limited to the foregoing embodiment. For example, there may be provided a warning device for a sense of vision, a sense of hearing, a sense of touch, and the like which warning device notifies a possibility of collision to the driver.

The above-described saddle riding type vehicle includes vehicles in general to be ridden by a driver straddling a vehicle body. The above-described saddle riding type vehicle includes not only motorcycles (including motor-assisted bicycles and motor scooter type vehicles) but also three-wheeled vehicles (including not only vehicles having one front wheel and two rear wheels but also vehicles having two front wheels and one rear wheel) or four-wheeled vehicles.

The constitution in the foregoing embodiment is an example of the present invention, and is susceptible of various changes, such for example as replacing constituent elements in the embodiment with well-known constituent elements, without departing from the spirit of the present invention.

DESCRIPTION OF REFERENCE SYMBOLS

1: Brake control device
2: Front brake
3: Rear brake
10: Brake modulator
16: Memory
17: Friction coefficient estimating unit (friction coefficient estimating means)
19: Collision possibility determining unit (collision possibility determining means)
20: Brake operation determining unit (brake operation determining means)
21: Automatic brake control unit (automatic brake control means)
22: Limit braking necessity determining unit (limit braking necessity determining means)
M: Braking force map
C, E: Limit line

The invention claimed is:

1. An automatic brake device for a vehicle, the automatic brake device comprising:
   a front brake and a rear brake configured to be actuated independently of each other; and
   a brake modulator configured to control actuation of the front and rear brakes;
   the brake modulator including
      collision possibility determining means for determining a possibility of collision of the vehicle with a front obstacle,
      automatic brake control means for performing automatic brake control that automatically increases braking forces of the front and rear brakes when the collision possibility determining means determines that there is a possibility of collision, and
      brake operation determining means for determining presence or absence of brake operation by a driver of the vehicle;
   wherein when the collision possibility determining means determines that there is a possibility of collision, and the brake operation determining means determines that the brake operation by the driver is absent,
      the automatic brake control means first actuates only the rear brake until a rear wheel braking force reaches a rear brake lock limit, and then also actuates the front brake while maintaining a rear brake lock limit state of the rear brake, and then the automatic brake control means increases the braking force of the front brake until the braking forces of the front and rear brakes reach a front-rear lock limit point.

2. The automatic brake device for a vehicle according to claim 1,
   wherein the brake modulator includes a memory configured to store a braking force map having an axis of ordinates indicating magnitude of the braking force of one of the front and rear brakes and having an axis of abscissas indicating magnitude of the braking force of the other of the front and rear brakes,
   wherein a limit line (E) and a limit line (C) respectively indicating braking forces as lock limits of the front and rear brakes are described in the braking force map, and
   wherein the automatic brake control means actuates the rear brake until the rear wheel braking force reaches the limit line (C) of the rear brake in the braking force map.

3. The automatic brake device for a vehicle according to claim 2,
- wherein the brake modulator includes friction coefficient estimating means for estimating a road surface friction coefficient,
- wherein a plurality of limit lines (E) and a plurality of limit lines (C) are described according to the road surface friction coefficient, and
- wherein the automatic brake control means selects the limit line (E) and the limit line (C) according to the road surface friction coefficient.

4. The automatic brake device according to claim 2,
- wherein the brake modulator includes a friction coefficient estimating unit configured to estimate a road surface friction coefficient,
- wherein a plurality of limit lines (E) and a plurality of limit lines (C) are described according to the road surface friction coefficient, and
- wherein the automatic brake control unit is configured to select the limit line (E) and the limit line (C) according to the road surface friction coefficient.

5. An automatic brake device for a vehicle, the automatic brake device comprising:
- a front brake;
- a rear brake, wherein the front brake and rear brake are configured to be actuated independently of each other; and
- an electronic control unit configured to
  - control actuation of the front brake and rear brake,
  - determine a possibility of collision of the vehicle with a front obstacle,
    - perform automatic brake control that automatically increases braking forces of the front brake and rear brake when the electronic control unit determines that there is a possibility of collision, and
  - determine presence or absence of brake operation by a driver of the vehicle,
- wherein when the electronic control unit determines that there is a possibility of collision, and the electronic control unit determines that the brake operation by the driver is absent,
  - the electronic control unit is configured to first actuate only the rear brake until a rear wheel braking force reaches a rear brake lock limit, and then also actuate the front brake while maintaining a rear brake lock limit state of the rear brake, and then increase the braking force of the front brake until the braking forces of the front and rear brakes reach a front-rear lock limit point.

6. The automatic brake device according to claim 5,
- wherein the electronic control unit includes a memory configured to store a braking force map having an axis of ordinates indicating magnitude of the braking force of one of the front and rear brakes and having an axis of abscissas indicating magnitude of the braking force of the other of the front and rear brakes,
- wherein a limit line (E) and a limit line (C) respectively indicating braking forces as lock limits of the front and rear brakes are described in the braking force map, and
- wherein the electronic control unit is configured to actuate the rear brake until the rear wheel braking force reaches the limit line (C) of the rear brake in the braking force map.

* * * * *